No. 841,334. PATENTED JAN. 15, 1907.
E. B. MOWER & E. JOHNSON.
NON-COLLAPSIBLE FLOAT.
APPLICATION FILED DEC. 21, 1905.

2 SHEETS—SHEET 1.

Witnesses
A. H. Opsahl
E. W. Jeppesen

Inventors
Eugene B. Mower,
Eleazer Johnson,
By their Attorneys
Williamson & Merchant No. 841,334. PATENTED JAN. 15, 1907.
E. B. MOWER & E. JOHNSON.
NON-COLLAPSIBLE FLOAT.
APPLICATION FILED DEC. 21, 1905.
2 SHEETS—SHEET 2.
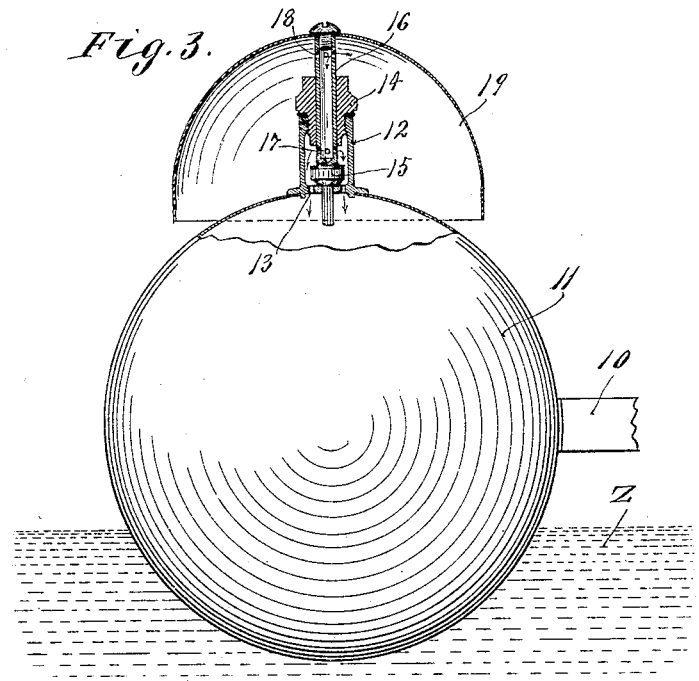
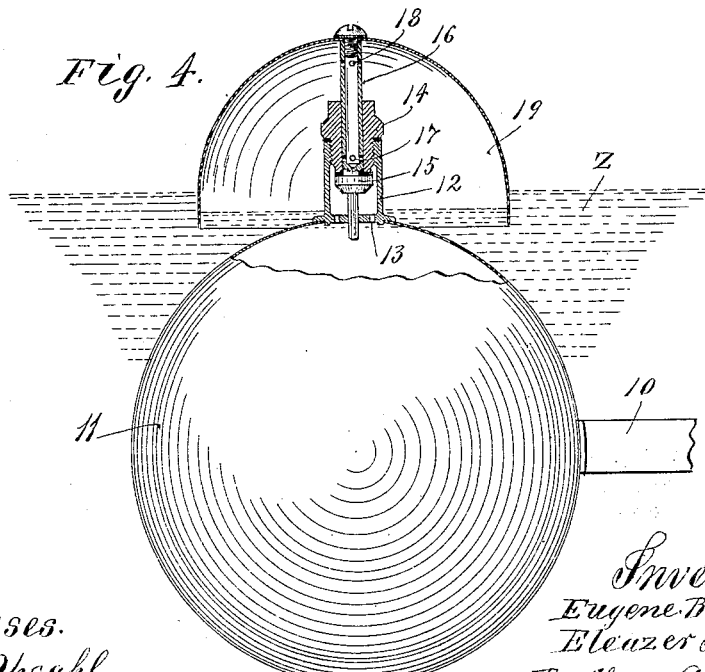
Witnesses.
A. H. Opsahl
E. W. Jefferson
Inventors.
Eugene B. Mower.
Eleazer Johnson
By their Attorneys.
Williamson & Merchant

UNITED STATES PATENT OFFICE.

EUGENE B. MOWER AND ELEAZER JOHNSON, OF MINNEAPOLIS, MINNESOTA.

NON-COLLAPSIBLE FLOAT.

No. 841,334.   Specification of Letters Patent.   Patented Jan. 15, 1907.

Application filed December 21, 1905. Serial No. 292,728.

*To all whom it may concern:*

Be it known that we, EUGENE B. MOWER and ELEAZER JOHNSON, citizens of the United States, residing at Minneapolis, in the county of Hennepin and State of Minnesota, have invented certain new and useful Improvements in Non-Collapsible Floats; and we do hereby declare the following to be a full, clear, and exact description of the invention, such as will enable others skilled in the art to which it appertains to make and use the same.

Our invention relates to floats such as used for opening and closing valves and for other purposes, and has for its object to provide a float of this character that will not be crushed or collapsed when the float is subjected to high pressure. This result is accomplished by the provision of a main and of a supplemental float and of a valve, the arrangement being such that normally said valve will be open and will admit air or gas under high pressure from the exterior into the interior of the main float, but will cause the said valve to close the air-passage to said main float whenever the latter is nearly or quite submerged in the water or other liquid, and thereby prevent the entrance of the water or liquid into the said main float.

The invention is illustrated in the accompanying drawings, wherein like characters indicate like parts throughout the several views.

Figure 1:
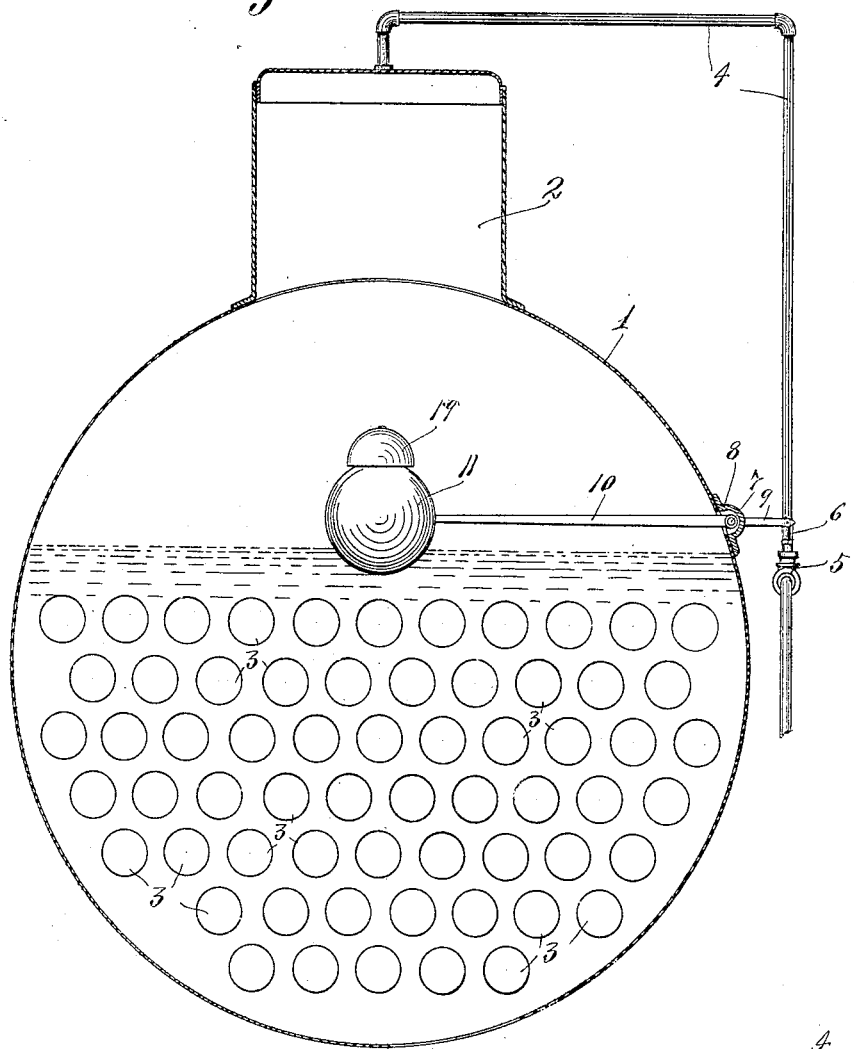
Figure 2:
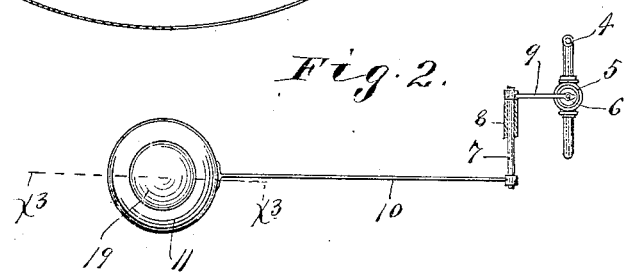

Figure 1 is a view in vertical section, showing the improved float applied within a steam-boiler and arranged to actuate a valve that controls the flow of steam from the boiler through a pipe. Fig. 2 is a plan view of the improved float and associated parts removed from the boiler. Fig. 3 is a view, partly in side elevation and partly in section, on the line $x^3$ $x^3$ of Fig. 2; and Fig. 4 is a view similar to Fig. 3, but illustrating different position of the float-valve and supplemental float with respect to the main float.

The numeral 1 indicates an ordinarily horizontal boiler, having a dome 2 and flues 3, which flues are indicated in diagram only.

The numeral 4 indicates a pipe which leads from the dome 2 and is provided with a valve 5, that is adapted to open and close, respectively, by the upper and downward movements of its valve-stem 6 and internal gate, the latter of which is not shown.

The numeral 7 indicates a short rock-shaft that extends from the exterior to the interior of the boiler and is, as shown, seated with a tight joint in a box 8, attached to the boiler-shell. A short arm 9 on the outer end of the rock-shaft 7 is loosely connected to the valve-stem 6. A long arm 10 is rigidly attached to the inner end of the rock-shaft 7, and to the free end of this arm is attached the main float 11, which is, as shown, of spherical form. This float 11, as is usual, is constructed in the form of a thin metal shell; but it may of course take various forms. Rigidly secured to the top of the main float 11 is a thimble-like bearing 12, provided at its bottom with a plurality of air-passages 13, that open into the float 11. A valve-seat 14 is, as shown, screwed into the upper end of the thimble 12 with the tight joint.

The numeral 15 indicates a valve-head that is adapted to be set against the lower end of the valve-seat 14 and is provided with a tubular stem 16, that works slidably within the valve-seat 14. Near its lower portion and close to the valve-head 15 the hollow stem 16 is provided with one or more radial air-passages 17, and near its upper end is likewise provided with one or more radial air-passages 18. A supplemental float 19 is rigidly secured to the upper end of the said valve-stem 16, as shown, and preferably is in the form of a hemisphere or bell, arranged with its open portion turned downward.

In the drawings the water which is contained in the boiler is indicated by the character $z$.

The action of the improved float will be made clear by the description of its particular use in connection with the boiler illustrated in the drawings.

In Figs. 1 and 3 the water is indicated at what may be assumed to be a normal level, at which time the main float 11 is only partially submerged therein, and the supplemental float 19 is held entirely above the water-level. Under such conditions it will be noted that the steam confined within the boiler may enter the main float 11 through the passages 18, 17, and 13, the float-valve being then in its open position, as clearly indicated in Fig. 3. Hence, as is evident, both the interior and the exterior of the main float 11 will be subjected to the same pressure—to wit, the boiler-pressure—so that there is at such time of course no tendency whatever to crush or collapse the said float.

When the water-level indicated in Figs. 1 and 3 is slightly reduced, the entire float will lower, and thus raise the valve-stem 6 and the gate attached thereto, thereby opening the valve 5 and permitting the steam to escape through the pipe 4. The steam allowed to escape from the pipe 4 can be used to operate a pump for forcing more water into the boiler or it may be used for other purposes.

The float cannot rise above the position shown in Figs. 1 and 3, because the valve 5 is then closed and forms a stop which limits the upward movement of the said float. When, however, the water rises around the main float 11 and closes the lower part of the supplemental float 19, it cages air or steam within said supplemental float, and the latter then acts as a float and moves upward with respect to the main float 11, thereby closing the passages 17 and the lower end of the valve-seat 14, thereby cutting off the communication between the interior of the main float 11 and the surrounding spaces within the boiler. In this way water is positively prevented from entering the main float, even though water should be forced high up within the supplemental float 19.

It will thus be seen that when the main float 11 is closed the pressure within the same is the same as formed without or within the main body of the boiler, so that there is no danger of collapse or crushing the float even while it is closed.

A float of the above character may be used for a great many different purposes and may take a great many different forms. In addition to the specific application shown in the drawings it may be here mentioned that the float is particularly well adapted for use in connection with apparatus for making carbonated beverages wherein liquid and gas are confined under very high pressure in inclosed receptacles. The said float is, however, generally useful wherever a float is required within receptacles that are charged under high pressure.

From what has been said it will of course be obvious that the float-actuated valve might be utilized to open and close a pipe for conducting water either to or from the boiler.

It is evident that with the device above described air confined or caged in the supplemental float 19 when the float is submerged will prevent water from rising into the said supplemental float to the altitude of the perforations 18, and hence would prevent the water from flowing into the main float even if the valve 15 were to be cut off or dispensed with.

What we claim, and desire to secure by Letters Patent of the United States, is as follows:

1. The combination with a hollow main float having a supplemental float that is open at its lower portion, and an air-vent affording communication between the upper interior portion of said supplemental float and the interior of said main float, whereby the air or steam caged in said supplemental float will prevent water from flowing into said main float, when the float is submerged, substantially as described.

2. The combination with a hollow main float having a valved vent, of a supplemental float arranged to close said valved vent whenever said main float is submerged to or beyond a predetermined extent, substantially as described.

3. The combination with a hollow main float having a valved vent in its upper portion, of a supplemental float in the form of an inverted bell, attached to the movable member of said valve-vent and arranged to close the same when the float is submerged to or beyond a predetermined extent, substantially as described.

4. The combination with a main float 11, of a perforated thimble 12 attached to the upper portion thereof, a valve-seat in the upper end of said thimble, a valve coöperating with the lower end of said valve-seat and having a perforated hollow stem and a supplemental float 19 attached to the upper end of said valve-stem with its upper portion turned downward, substantially as described.

In testimony whereof we affix our signatures in presence of two witnesses.

EUGENE B. MOWER.
ELEAZER JOHNSON.

Witnesses:
  MALIE HOEL.
  F. D. MERCHANT.